R. H. TUCKER.
Fire-Escape.

No. 227,324.   Patented May 4, 1880.

Witnesses:
R. F. Barnes.
Warren Seely.

Inventor:
Richard H. Tucker
by Elias Leem
Attorney

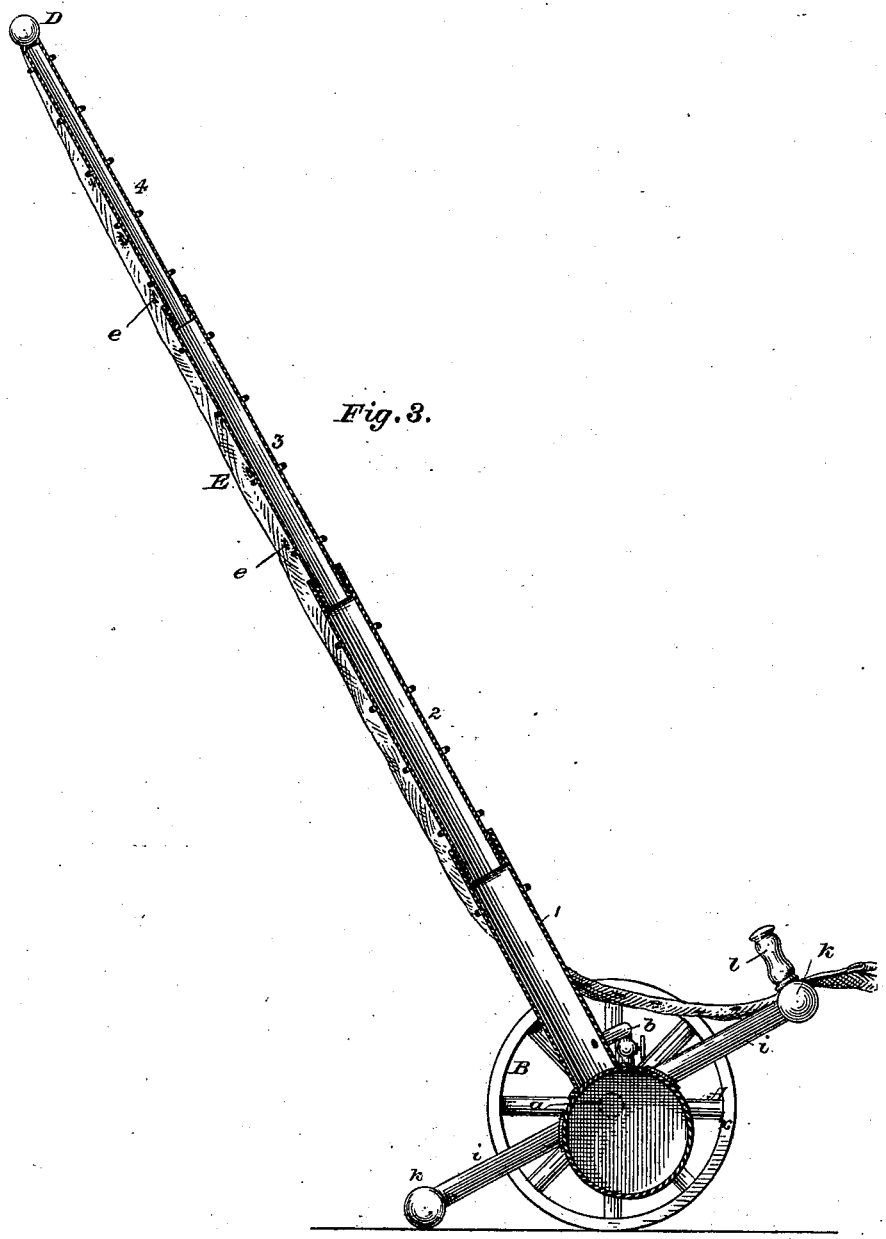

UNITED STATES PATENT OFFICE.

RICHARD H. TUCKER, OF NEW YORK, N. Y.

FIRE-ESCAPE.

SPECIFICATION forming part of Letters Patent No. 227,324, dated May 4, 1880.

Application filed January 5, 1880.

*To all whom it may concern:*

Be it known that I, RICHARD H. TUCKER, of New York, in the county of New York and State of New York, have invented a new and useful Improvement in Pneumatic Fire-Escapes; and I do hereby declare that the following is a full, clear, and exact description of the same.

My invention relates to fire-escapes of that class which are made extensible from a fixed or movable base, to which the extensible part is secured.

The objects of the invention are, first, to obtain a ready and sufficient force to raise the expansible or extensible portion of the escape; second, to provide means whereby the attendants can readily and safely ascend or descend; third, to secure a safe and expeditious transfer of persons or goods from the upper part of buildings in case of fire; and, fourth, in connection with these objects, to provide a fire-escape which shall be compact, portable, and not liable to get out of order, and expeditious and convenient in use.

Figure 1:
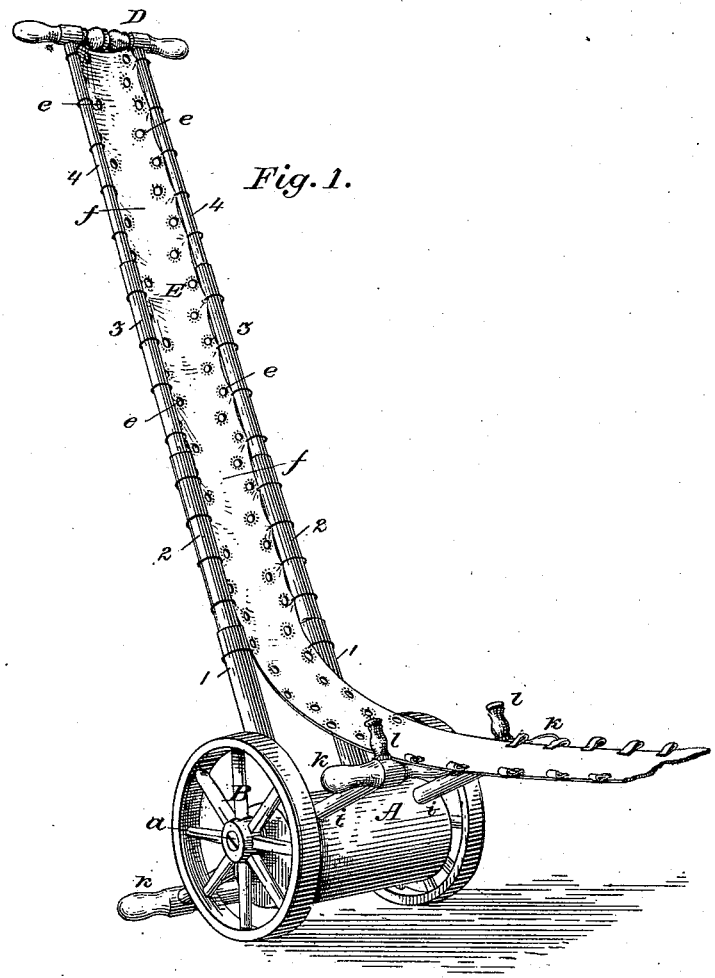
Figure 2:
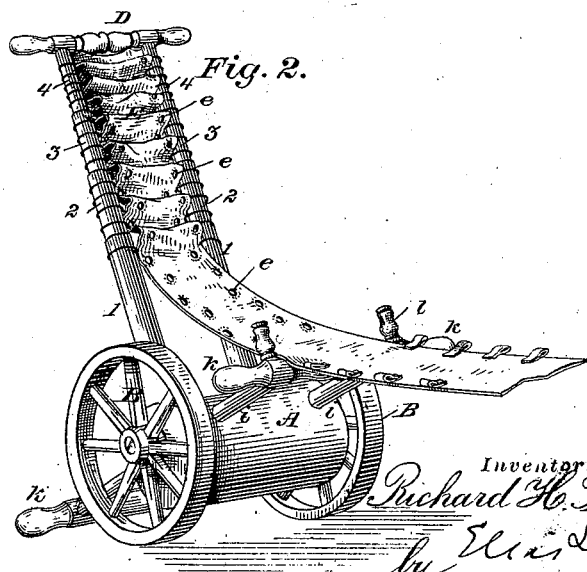

In the drawings which accompany this specification, Figure 1 is a perspective view of the apparatus extended and ready for use. Fig. 2 shows a like view of the apparatus closed and ready to be moved, and Fig. 3 a section through the telescopic tubes and the air-tank.

In these drawings, A represents a strong metallic air-tight tank, made preferably cylindrical in shape, as shown, and mounted upon wheels B B by means of trunnions $a\,a$, located near the upper edge of the tank when in proper position. This arrangement of the trunnions adapts the tank to serve as a counterbalance for the telescopic tubes above it. This tank should be made of a strength suitable to contain air under pressure of at least one hundred pounds to the square inch. The mode of construction and the materials fitted for the purpose of containing air and for receiving air from suitable pumps need not be different from tanks for like purposes, and may be left to the skill of the workmen.

Upon the tank A (which may be preferably six feet in length) I fix firmly two sections of wrought-metal tube, four or five feet apart and in the same plane. These tubes open into the tank, and may be provided with any suitable valves or stop-cocks, as shown at $b\,b$, to admit the air from the tank into the tubes.

In practice I contemplate making these tubes about six inches in diameter; but the size of them and the thickness of the material of which they are made may be varied for different sizes of the apparatus and for different conditions of use. To these fixed sections (marked 1 1 in the drawings) is connected a series of telescopic sections, 2 2, 3 3, 4 4, as shown clearly in the drawings. These sections are made to slide each within that next below it, through suitable stuffing-boxes, whereby the connections are made practically air-tight. Any desired number of the sections may be used, it being observed, however, that the apparatus when closed should be of a length convenient for transportation and storage.

The upper ends of the upper sections are closed air-tight and provided with a transverse bar, D, which holds the two sections securely at proper distance apart. Additional curved braces may be provided at the tops of the intermediate sections, the curvature being sufficient to permit the passage of a person on the strip underneath said braces. In an ordinary-sized apparatus, however, the upper transverse bar, D, will probably be sufficient.

Upon the telescopic tubes is mounted a strip, preferably of canvas, (indicated in the drawings at E.) It is represented as connected with the tubes by means of rings fitted to slide upon the sections. The upper end is connected to the transverse bar D, so that as the telescopic tubes are extended the strip is carried up with them, the rings sliding freely as the sections rise.

On each side of the canvas strip are arranged openings $e\,e$, which may be made of a shape fitted to receive the foot, and may be bound upon the edge with metal or any equivalent kind of binding, to prevent undue wear. These openings or steps are arranged alternately, and are a convenient distance apart for ease of ascent or descent. A sufficient space is left between them, as shown at $f\,f$, to permit the passage downward of persons or goods which it may be necessary to lower.

For a better operation of the apparatus, the strip is made so as to bag slightly along its central line, as it will naturally do under the weight, and by the stretch of the canvas itself, and by the yielding of the tubes to which it is attached. The arrangement of this channel or passage-way between two series of steps will permit the attendants to conduct with safety women or children or feeble persons, without danger or serious inconvenience, from the top of the escape to the bottom. Goods may be allowed to slide down without danger of displacement, whatever is lowered in this passage-way being received upon the lower end of the strip, which is held in a horizontal position, as shown in Fig. 1.

In practice, an opening will be provided in the tank, as shown in dotted lines at $x$, for attaching thereto the pipe-connection with an air-compressor, and proper valves must be supplied at such connection.

It is contemplated that the tank will be kept filled with compressed air, constantly ready for use when brought to the building where it is to be used.

The air from the cylinders may be admitted into the telescopic tubes, by the force of which air these tubes will be raised, the height to which they are raised being determined by the amount of air admitted thereto.

Ordinarily the force of the air will be sufficient to hold the tubes in an extended position; but they may be held by catches applied at each section, or by grappling apparatus at the upper end.

For convenience in transporting and holding the apparatus in place, I have provided rods $i\ i$ and handles $k\ k$ upon each side. These rods are fixed to the tank A, preferably at right angles to the telescopic sections. The handles $k\ k$ serve the purpose of ordinary handles when the apparatus is transported from place to place and the further purpose of a rest and support when the apparatus is extended and in use.

The handle upon one side rests upon the ground, while that upon the opposite side may be firmly held by the attendants.

Small posts $l\ l$ may be inserted upon the handle to guide and hold in place the strip.

Having thus described my invention, what I claim, and desire to secure by Letters Patent, is—

1. The air-tank A, the telescopic tubes 1 1 2 2, and the intermediate strip and the valve-connection, as and for the purposes set forth.

2. An air-tank, A, having telescopic tubes connected directly thereto, supported upon a pair of wheels, the said supporting-wheels forming the means by which the angle of elevation of the tubes is changed, as described.

3. The combination, with a tank having telescopic tubes connected directly thereto and a single pair of wheels to support it, of handles $k$ on both sides of such tank, adapted to allow the ladder to be raised and supported in either direction, as set forth.

4. The combination, with the telescopic tubes, of the canvas strip, adapted to operate as set forth.

5. In combination with the telescopic tubes, the canvas strip E, having the central clear space and side steps, as set forth.

In testimony whereof I have signed my name to this specification in the presence of two subscribing witnesses.

RICHARD H. TUCKER.

Witnesses:
 WARREN SEELY,
 FRANK MIDDLETON.